United States Patent [19]
Beijleveld et al.

[11] Patent Number: 5,091,479
[45] Date of Patent: Feb. 25, 1992

[54] USE OF OLIGOMERS OF ALKENYL GROUPS-SUBSTITUTED AROMATICS AS CO-AGENTS

[75] Inventors: Wilhelmus M. Beijleveld, ZM Olst; Willem C. Endstra, AV Epse, both of Netherlands

[73] Assignee: Akzo NV, Arnhem, Netherlands

[21] Appl. No.: 443,978

[22] Filed: Nov. 30, 1989

[30] Foreign Application Priority Data

Dec. 6, 1988 [NL] Netherlands .................. 8802994

[51] Int. Cl.$^5$ .................. C08F 4/32; C08F 255/02; C08F 255/04
[52] U.S. Cl. .................. 525/263; 525/316; 525/322
[58] Field of Search .................. 525/263, 316, 322

[56] References Cited

U.S. PATENT DOCUMENTS 2,516,649 7/1950 Rust et al. .
4,091,223 5/1978 Zussmann et al. .

OTHER PUBLICATIONS

Colvin, H. A. & Muse, J., "Polymers from diisopropenylbenzene", *Chemtech*, Aug. 1986, pp. 500–504.
Hofmann, W., "Crosslinking Agents in Ethylene-Propylene Rubbers", *Progress in Rubber and Plastics Technology*, vol. 1, No. 2, Mar. 1985, pp. 18–50.
Keller, Robert C., "Peroxide Curing of Ethylene-Propylene Elastomers", *Rubber and Chemical Technology*, vol. 61, pp. 238–254.

*Primary Examiner*—Jacob Ziegler
*Attorney, Agent, or Firm*—David H. Vickrey; Louis A. Morris

[57] ABSTRACT

The present invention relates to a process for modifying or crosslinking polymers by the use of novel co-agents in the reaction of polymers with organic peroxides. The novel co-agents comprise oligomers of dialkenyl substituted aromatic compounds, preferably oligodiisopropenylbenzene.

9 Claims, No Drawings

USE OF OLIGOMERS OF ALKENYL GROUPS-SUBSTITUTED AROMATICS AS CO-AGENTS

BACKGROUND OF THE INVENTION

The invention relates to a process for the modification of (co)polymers by reacting them with organic peroxides in the presence of a co-agent, and to shaped products composed of these modified (co)polymers.

It is generally known that modifying appropriate (co)polymers with organic peroxides in the presence of a co-agent may result in improved physical properties of the (co)polymers. Conventional co-agents are polyfunctional reactive additives promoting the formation of networks. They react with polymer radicals very rapidly, prevent steric effects, and minimize objectionable side reactions such as radical-induced polymer degradation.

Monomeric co-agents which are frequently used are allyl-containing compounds, such as triallyl cyanurate (TAC), and (meth)acrylates, such as ethylene glycol dimethacrylate. There are, however, several drawbacks to these co-agents. First of all, many of the above-mentioned compounds have a disagreeable odour and are volatile and thus cause problems when processed at relatively high temperatures. Secondly, the elongation at rupture of cross-linked (co)polymers decreases as the amount of a monomeric co-agent processed with a (co)polymer is increased. This renders it virtually impossible to prepare (co)polymers combining a low compression set and a high elongation at rupture by employing these known monomeric co-agents. Low compression set and a high elongation rupture are particularly desirable for (co)polymers used in seals and sections in, for instance, the automotive industry. Also, the known co-agents are generally incapable of preventing unacceptable amounts of radical-induced polymer degradation.

In addition to said monomeric co-agents, some polymeric co-agents are also known. Commercially available polymeric co-agents are typically polybutadiene formulations. When combined with organic peroxides these polybutadiene formulations have the disadvantage that they have to be added in relatively large amounts in order to obtain the desired degree of cross-linking.

Chemtech (August 1986) pp. 500-504 discloses polymers of 1,3- and 1,4-diisopropenylbenzene and their preparative process. In this article it is also mentioned that mixtures of the monomeric compounds 1,3- and 1,4-diisopropenylbenzene, when copolymerized with styrene, were found to be less efficient cross-linking agents than conventional cross-linking agents.

The invention overcomes the above-indicated drawbacks associated with the use of the co-agents, and to this end provides a process in which particular co-agents are employed for the modification of (co)polymers in the presence of an organic peroxide.

SUMMARY OF THE INVENTION

The invention relates to a process for the modification of (co)polymers in the presence of an organic peroxide and a co-agent, wherein the co-agent is a (co)oligomer of at least one aromatic group substituted with at least two $C_{3-6}$-alkenyl groups.

The invention further relates to polymers modified by the process according to the invention. Because of their low volatility and their high excellent cross-linking ability, the co-agents according to the invention are especially suitable for use in the modification of polymers at elevated temperatures.

DETAILED DESCRIPTION OF THE INVENTION

The (co)oligomers to be used in the process of the invention may be prepared in a manner known for such compounds, for instance by acid-catalysed oligomerization of alkenyl-substituted aromatics in an appropriate solvent. As examples of alkenyl-substituted aromatics that may be used in preparing the present oligomers may be mentioned: 1,3-diisopropenylbenzene, 1,4-diisopropenylbenzene, 1,3,5-triisopropenylbenzene and/or 1,2,4-triisopropenylbenzene.

These aromatics may be oligomerized in an appropriate solvent, such as heptane, octane, toluene, xylene, and/or cumene, with a catalytic amount of an appropriate acid, such a p-toluene sulphonic acid, benzene sulphonic acid, methane sulphonic acid, and/or formic acid.

Alternatively, it is possible to carry out the above-described preparative process making use of tertiary alcohols that are first dehydrated and then oligomerized. Examples of suitable tertiary alcohols include: 1,3-di(2-hydroxyisopropyl)-benzene, 1,4-di(2-hydroxyisopropyl) benzene, 1,3,5-tri(2-hydroxyisopropyl) benzene, and 1,2,4-tri(2-hydroxyisopropyl)benzene.

Of course, it is also possible for mixtures of suitable monomers to be oligomerized. The iodine number of the coagents useful in the process of the invention may vary over a wide range. Generally, higher iodine numbers are preferred since a higher degree of residual aliphatic unsaturation renders the coagent more effective. The iodine number is generally higher at lower monomer conversions and is lessened by continuing the oligomerization to higher monomer conversions.

The weighted average of the degree of oligomerization of the co-agents to be used according to the invention is preferably in the range of 1.5 to 50, more particularly in the range of 2 to 25. The degree of oligomerization can be controlled by, for example, terminating the reaction at monomer conversions of less than 100%. The unreacted monomer may then be recycled as a reactant in a later oligomerization. Generally, lower conversion will give oligomers with lower degrees of oligomerization and higher conversions lead to a greater degree of oligomerization.

The above-described co-agents may advantageously be employed in (co)polymers having both relatively low and relatively high processing temperatures.

As examples of (co)polymers to be treated according to the invention may be mentioned: ethylene-propylene copolymers (EPM), ethylene-propylene-diene monomer copolymer (EPDM), examples of diene monomers include ethylene diene norbornane, dicyclopentadiene, 1,4-hexadiene, styrene-butadiene rubber (SBR), acrylonitrile-butadiene rubber (NBR), natural rubber (NR), polyisoprene rubber (IR), ethylene-vinyl acetate copolymers (EVA), acrylonitrile-butadiene-styrene copolymers (ABS), styrene-butadiene-styrene rubber (SBS), styrene-isoprene-styrene copolymers (SIS), polychloroprene rubber, chlorinated polyethylene (CM), polyurethane rubber (AU/EU), high density polyethylene (HDPE), low density polyethylene (LDPE, LLDPE), silicone rubber, polyisobutylene, and polybutadiene. The polymer compound obtained may be subjected to relatively high temperatures in order to obtain a low viscosity and, hence, favourable processability. It is preferred that the present process should be used in modifying ethylene (co)polymers, such as EPM, EPDM, EVA, and CM.

As radical initiating modifiers may be used the organic peroxides known to be employed for this purpose, such as di-t-butyl peroxide, t-butyl cumyl peroxide, bis-(t-butylperoxyisopropyl)benzene, dicumyl peroxide, 4,4-di-t-butylperoxy-n-butyl valerate, 2,5-di-t-butylperoxy-2,5-dimethyl hexane, 2,5-di-t-butylperoxy-2,5-dimethyl hexyne-3,1-(t-butylperoxyisopropyl)-3-isopropenylbenzene, 1,1-di-t-butylperoxy-3,3,5-trimethyl cyclohexane, t-butylperoxybenzoate, dibenzoyl peroxide, bis(p-chlorobenzoyl)peroxide, bis(2,4-dichlorobenzoyl)peroxide, and o,o-t-butyl o-stearyl monoperoxycarbonate. Alternatively, use may be made of combinations of peroxides. In general, 1-10 parts by weight and preferably 1-3 parts by weight of organic peroxide are added to 100 parts by weight of the (co)polymer to be modified. The amount of co-agent to be used generally is 0.1 to 10 parts by weight and preferably 0.5 to 3 parts by weight per 100 parts by weight of the (co)polymer to be modified. Also, use may be made of combinations of co-agents according to the invention or combinations of co-agents according to the invention with already known co-agents.

In addition there may be added to the (co)polymer to be modified conventional amounts of the usual additives, such as inhibitors against oxidative, thermal, and UV degradation; lubricants, release agents, colorants, reinforcing or non-reinforcing fillers, such as silica, clay, chalk, carbon black, and fibrous materials; nucleating agents, plasticizers, extender oils, and pH controlling substances, such as calcium carbonate.

Using conventional techniques it is possible for the (co)polymer composition to be mixed and shaped in a broad temperature range, depending on the type of modifying peroxide and the processing temperatures of the (co)polymer. The modifying reaction is typically carried out under conventional conditions making use of the appropriate equipment.

The examples below serve to illustrate the invention.

EXAMPLE 1

Preparation of 1,3-diisopropenylbenzene oligomer (co-agent 1)

To 400 g of 1,3-diisopropenylbenzene were added 1200 ml of heptane and 480 mg of p-toluene sulphonic acid 1 aq. and the whole was then stirred for 4 hours at 75° C. The reaction mixture was washed with 200 ml of NaOH (2N) and subsequently with water until a neutral pH was obtained.

The organic layer was concentrated by evaporation at a temperature of 100° C. and a pressure of 0.1 mbar, with the heptane and unconverted 1,3-diisopropenylbenzene being removed. Obtained were 132 g of clear viscous oil of which the following composition (in per cent by weight) was determined by high performance size exclusion chromatography (HPSEC):

| monomer | 0.8% |
| dimer | 23.7% |
| trimer | 28.7% |
| tetramer | 12.8% |
| pentamer | 15.0% |

| -continued | |
|---|---|
| hexamer | 19.0% |

Iodine number of coagent 1: 172 g $I_2$/100 g.
Iodine number of monomer: 321 g $I_2$/100 g.
The weighted average degree of oligomerization is $(0.8\times1)+(23.7\times2)+(28.7\times3)+(12.8\times4)+(15.0\times5)+(19.0\times6))/100=3.75$.

Preparation of 1,3-diisopropenylbenzene/isopropenylbenzene (co)oligomer (coagent 2)

To 20 g of 1,3-diisopropenylbenzene and 15 g of isopropenylbenzene (molar ratio 1:1) were added 100 ml of heptane and 125 mg of p-toluene sulphonic acid, and the whole was then stirred for 3 hours at 100° C. The reaction mixture was treated in the same way as described for co-agent 1. Obtained were 32 g of highly viscous oil of which the following composition (in per cent by weight) was determined by HPSEC:

| monomer | 0.4% |
| dimer | 1.4% |
| trimer-pentamer | 10.0% |
| ≧ hexamer | 88.2% |

Iodine number of coagent 2: 86 g $I_2$/100 g.

Preparation of 1,3-diisopropenylbenzene oligomer from 1,3(2-hydroxyisopropyl)benzene(co-agent 3)

To 78 g of 1,3-di(2-hydroxyisopropyl)benzene were added 330 ml of toluene and 633 mg of p-toluene sulphonic acid, and the whole was then stirred at 90° C. In this process the hydroxyisopropyl groups were dehydrated. The released water was distilled off by gradually increasing the temperature to 114° C. After all the water had been removed, the whole was stirred for a further 3 hours at 114° C. Obtained were 72 g of white solids, of which the following composition (in per cent by weight) was determined by HPSEC:

| monomer | 0.5% |
| dimer | 1.2% |
| trimer-pentamer | 10.0% |
| ≧ hexamer | 88.0% |

Iodine number of co-agent 3: 59 g $I_2$/100 g.

Preparation of 1,3-diisopropenylbenzene/1,4-diisopropenylbenzene co-oligomer (co-agent 4)

In the preparation, use was made of crude 1,3-di(2-hydroxyisopropyl) benzene/1,4-di(2-hydroxyisopropyl)benzene of a molar ratio of 7:1, which also contained 9% of monohydroxyisopropylbenzene and 6% of water.

To 43 g of the above-mentioned mixture were added 185 ml of toluene and 120 mg of p-toluene sulphonic acid, and the whole was then treated as described for co-agent 3. After the removal of the water and further treatment there were obtained 15.6 g of yellow viscous material of which the following composition (in per cent by weight) was determined by HPSEC:

| monomer | 0.7% |

-continued

| | |
|---|---|
| dimer | 18.1% |
| trimer | 24.3% |
| tetramer | 14.9% |
| pentamer | 12.5% |
| hexamer | 18.8% |
| ≧heptamer | 10.7% |

Iodine number of co-agent 4: 178 g $I_2$/100 g.

EXAMPLE 2

Volatility of the oligomeric co-agents determined by thermogravimetric analysis (TGA)

In a Mettler ® TG50 thermobalance there was measured, with nitrogen being passed through, the mass loss of samples of 30 mg of the co-agents described in Example 1 after periods ranging from 2.5 to 25 min. at temperatures of 150° C. and 175° C., respectively. The co-agents according to the invention were compared with triallyl cyanurate (TAC, Perkalink ® 300), a commercially available co-agent. The results are given in Table 1.

TABLE 1

Volatility of oligomers, determined by TGA

| | % Mass loss against time | | | | | |
|---|---|---|---|---|---|---|
| Sample | 2.5 min. | 5 min. | 10 min. | 15 min. | 20 min. | 25 min. |
| Temperature 150° C. | | | | | | |
| Co-agent 1 | 0.45 | 0.81 | 1.4 | 1.9 | 2.3 | 2.7 |
| Co-agent 2 | 0.72 | 0.95 | 1.2 | 1.7 | 2.1 | 2.5 |
| Co-agent 3 | 0.58 | 0.81 | 1.1 | 1.3 | 1.4 | 1.5 |
| Co-agent 4 | 1.0 | 1.6 | 2.2 | 2.5 | 2.8 | 3.1 |
| TAC (comparison) | 1.8 | 4.6 | 10.3 | 16.2 | 22.0 | 27.7 |
| Temperature 175° C. | | | | | | |
| Co-agent 1 | 1.3 | 2.3 | 3.8 | 5.1 | 6.5 | 7.5 |
| Co-agent 2 | 1.5 | 2.3 | 2.7 | 3.1 | 4.2 | 5.5 |
| Co-agent 3 | 1.0 | 1.5 | 2.0 | 2.4 | 2.7 | 2.9 |
| Co-agent 4 | 2.3 | 3.2 | 4.3 | 5.0 | 5.5 | 6.0 |
| TAC (comparison) | 6.2 | 16.6 | 36.8 | 56.0 | 73.0 | 78.8 |

Table 1 shows the oligomers obtained in conformity with Example 1 to be less volatile than the commercial co-agent triallyl cyanurate.

EXAMPLE 3

Effect on the mechanical properties of ethylene/propylene copolymer cross-linked in the presence of oligomeric 1,3-diisopropenylbenzene For the test described in this Example use was made of the co-agents 1, 3 and 4 obtained in conformity with Example 1.

For comparison, the commercial co-agents triallyl cyanurate (Perkalink ® 300) and 1,2-cis-polybutadiene (Scanomol ® 32GO) were employed.

In a GIUX mixer ethylene/propylene copolymer (Vistalon ® 404) was mixed, over a period of 5 min. at 70°–80° C. and 77 rotor revolutions per minute, with 50 parts by weight of carbon black (N762 type), 10 parts by weight of plasticizer (Sunpar ® 2280), two stabilizers (Flectol ® H and Vulkanox ® ZMB) and an amount of co-agent calculated on the amount of copolymer used.

Next, 7.6 parts by weight of 40% 1,1-di(tert.-butyl-peroxyl)3,5,5-trimethyl cyclohexane (Trigonox ® 29-40 Bpd) were added and intermixed with the copolymer composition on a roll mill over a period of 5 minutes at 40°–50° C. and 43–48 rotor revolutions per minute. The cross-linking behaviour of the resultant mixture was determined with a rheometer in accordance with ASTM D2084. The Delta torque was measured at 121° C. at an oscillation angle of 3° and an oscillation frequency of 0.6 Hz.

The mixture was vulcanized in a mould for 15 min. at 150° C. Tensile strength (MPa) and Elongation at rupture (%) were determined in accordance with ISO standard B37 type 2. The compression set (%) was determined after 24 hours at 100° C. in accordance with ASTM ® 395 method B. Also, the effect of the co-agents was determined by rheometer delta torque (Nm) as a measure of co-agent efficiency. The results are given in Table 2 (Additives are indicated in parts by weight per 100 parts by weight of polymer).

TABLE 2

| | EPM + org. peroxide + additives | | | | | |
|---|---|---|---|---|---|---|
| Co-agent | 1 | 2 | 3 | 4 | TAC | polybutadiene |
| Additives (parts by weight) | 0.8 | 1.6 | 0.8 | 0.8 | 1.7 | 1 | 5 |
| Tensile Strength (MPa) | 11.3 | 11.4 | 9.7 | 11.6 | 8.8 | 3.4 | 7.1 |
| Elongation at rupture (%) | 535 | 565 | 490 | 410 | 382 | 745 | 505 |
| Compression set (%) | 18 | 18 | 23 | 17 | 17 | 60 | 35 |
| Delta torque (Nm) | 3.6 | 3.4 | 2.9 | 4.7 | 4.0 | 1.2 | 2.5 |

Table 2 shows that using small amounts of co-agents according to the invention in cross-linking EPM leads to a product having a high tensile strength, a low compression set and a relatively high elongation at rupture. Such a favourable combination cannot be obtained using triallyl cyanurate (TAC) as co-agent. Also, it has been found that the use of a small amount of co-agent 1 provides a significantly higher Delta torque than larger amounts of 1,2-cis-polybutadiene.

Although EPM cross-linked in the presence of 1 part by weight of 1,2-cis-polybutadiene has a higher elongation at rupture than EPM cross-linked in the presence of co-agent 1, its remaining mechanical properties, indicate that EPM cross-linked with 1 part by weight of 1,2-cis-polybutadiene is not useful material for commercial applications.

EXAMPLE 4

Effect of 1,3-diisopropenylbenzene oligomer on radical-induced polymer degradation in comparison with the effect of triallyl cyanurate In a Haake Rheomix ® 500 electrically heated mixing chamber with a capacity of 53 g, 1,3-diisopropenylbenzene (co-agent 1 in conformity U.S. Pat. No. 2,516,649), or alpha-(2-methyl-3-buten-2-ylperoxy) isopropylbenzene or 1,3-di[alpha-(2-methyl-3-buten-2-ylperoxy) isopropyl]-benzene (CtPPO and bPCPO, respectively, described in EP-A-273 990) were mixed with polypropylene (Hostalen ® PPU 0180P, MFI (190° C.; 2.16 kg)=6.3 g/10 min; ex Hoechst) for 15 min. at a temperature of 180° C. and 30 rotor revolutions per minute. The amounts of TAC, coagent 1, and peroxide are indicated in Table 3 and are calculated on 100 g of polypropylene.

During the reaction the torque was plotted against time using a Haake ® Record system 40, the torque-after-10 minutes (M10) and the increase in torque during the reaction (TQ) being derived therefrom.

The results are given in Table 3.

TABLE 3

| Co-agent I (phr) | TAC (phr) | CAPO | CtPPO | bPCPO | $M_{10}$ (mg) | TQ (mg) |
|---|---|---|---|---|---|---|
| | | | (mmole/100 g PP) | | | |
| — | — | — | — | — | 598 | 0 |
| 1.0 | — | — | — | — | 534 | " |
| 5.0 | — | — | — | — | 478 | " |
| 1.0 | — | 20 | — | — | 203 | <50 |
| 2.5 | — | " | — | — | 610 | 600 |
| 5.0 | — | " | — | — | 683 | 840 |
| — | 5.0 | — | — | — | 458 | 0 |
| — | 1.0 | 20 | — | — | <30 | " |
| — | 2.5 | " | — | — | 203 | 30 |
| — | 5.0 | " | — | — | 468 | 60 |
| 2.5 | — | — | 20 | — | 752 | 824 |
| 2.5 | — | — | — | 10 | 752 | 793 |

The values in Table 3 clearly demonstrate that the degradation of polypropylene under the influence of cumyl-allyl-peroxide is inhibited by the addition of co-agent 1. In comparison, triallyl cyanurate does not provide a useful polymer. Use of the unsaturated peroxides CAPO, CtPPO and bPCPO has the additional advantage of introducing functional groups into the polymer as described in EP-A-273 990. The adhesive properties of the modified polymer which have been improved over polar materials, are still further improved by the use of the co-agents.

EXAMPLE 5

In a standard, double-walled 2.50 liter glass reactor having an inside diameter of 15 cm equipped with a stainless steel MIG stirrer having 3 blades of 11.3 cm in diameter, a thermocouple and a Dean-Stark water trap, were mixed 577 gr. of m-diisopropenylbenzene (97–99%, ex. Cyanimide), 532 gr. of m-diol (99%, ex. Mitsui), 808 gr. toluene and 1.82 gr. of para-toluene sulphonic acid. The reactor was then flushed with nitrogen in order to carry out the reaction in a nitrogen atmosphere. Over a period of one hour the mixture was heated under stirring at 500 r.p.m. to 97° C. The mixture began to reflux at 85°–90° C. and the water evolved was removed by the Dean-Stark trap. The temperature was raised over a subsequent 30 minute period to 113° C. and then finally to 130° C. where it was maintained for a 3.5 hour period and stirring was continued throughout.

The reaction mixture was then cooled to 96° C. and the stirring rate was reduced to 230 r.p.m. and 352 grams of water were added. After three minutes of stirring the mixture was allowed to stand for 15 minutes and a 323 gram water layer was removed. The product was then washed with 350 gr. of $H_2O$ containing 480 mg. of NaOH. After 5 minutes of stirring and 60 minutes standing, a 328 gram water layer was separated at 80° C. A third wash was done with 358 grams of $H_2O$ with 5 minutes of stirring and 60 minutes standing whereupon a 390 gram water layer was removed. The remaining material was stripped (160° C. and 14 mbar) to obtain a distillate of 808 grams toluene, 20 grams water and 549 grams m-diene. The product was obtained as an oily residue in a yield of 450 grams (conversion 45%). The product has an iodine number of 195 gr. $I_2$/100 gr. This example demonstrates a successful scaled-up procedure of preparing an oligomer useful as a coagent in the process of the present invention.

The foregoing examples have been presented for the purposes of illustration and description only and are not to be construed as limiting the scope of the invention. The scope of the invention is to be determined by the claims appended hereto.

We claim:

1. A process for the modification of (co)polymers by reacting said (co)polymers with 1 to 10 parts by weight organic peroxides per 100 parts (co)polymer in the presence of 0.1 to 10 parts by weight co-agent per 100 parts (co)polymer, wherein said co-agent comprises a (co)oligomer of an aromatic compound substituted with at least two $C_{3-6}$ alkenyl groups and having a degree of oligomerization of 1.5 to 50.

2. A process according to claim 1, wherein said alkenyl substituents are alpha-beta-unsaturated.

3. A process according to claim 2, wherein said alkenyl substituents are isopropenyl groups.

4. A process according to claim 3, wherein said alkenyl groups-substituted aromatic compound is selected from the group consisting of:
   1,3-diisopropenylbenzene, 1,4-diisopropenylbenzene, 1,3,5-triisopropenylbenzene, and 1,2,4-triisopropenylbenzene.

5. A process according to claim 1 wherein said coagent comprises a cooligomer obtained from a monomer mixture containing up to 60 mole % of a mono-$C_{3-6}$-alkenyl-substituted aromatic.

6. A process according to claims 1 wherein said coagent is obtained by acid-catalysed (co)oligomerization.

7. A process according to claim 1, wherein the amount of co-agent comprises 0.5–3% by weight of the (co)polymer to be modified.

8. A process according to claim 1 wherein said (co)polymers to be modified comprise alpha-olefin (co)polymers.

9. A process according to claim 1 wherein said (co)polymers are cross-linked by the process.

* * * * *